United States Patent [19]

Mori

[11] Patent Number: 4,511,755
[45] Date of Patent: Apr. 16, 1985

[54] SOLAR RAY COLLECTION APPARATUS

[76] Inventor: Kei Mori, 3-16-3-501, Kaminoge, Setagaya-ku, Tokyo, Japan

[21] Appl. No.: 493,095

[22] Filed: May 9, 1983

[30] Foreign Application Priority Data

May 17, 1982 [JP] Japan ................... 57-81477
Jun. 3, 1982 [JP] Japan ................... 57-95969
Dec. 31, 1982 [JP] Japan ................... 57-230792

[51] Int. Cl.³ .................. H01L 31/04; G02B 5/14
[52] U.S. Cl. ................ 136/246; 136/259; 126/440; 126/441; 350/96.10; 350/96.24; 350/258; 350/265
[58] Field of Search ............ 136/246, 259; 126/440, 126/441; 250/227; 350/96.10, 258, 265, 96.24

[56] References Cited

U.S. PATENT DOCUMENTS

| | | | |
|---|---|---|---|
| 4,026,267 | 5/1977 | Coleman | 126/436 |
| 4,186,033 | 1/1980 | Boling et al. | 136/247 |
| 4,297,000 | 10/1981 | Fries | 350/96.24 |
| 4,307,936 | 12/1981 | Ochiai | 350/96.24 |
| 4,389,085 | 6/1983 | Mori | 350/96.10 |
| 4,411,490 | 10/1983 | Daniel | 350/96.10 |

Primary Examiner—Aaron Weisstuch
Attorney, Agent, or Firm—Jordan and Hamburg

[57] ABSTRACT

A solar ray collection apparatus includes a plurality of lenses mounted on at least one of the opposing flat surfaces of a lens mount. A plurality of light conducting members equal in number to the lenses are carried by a conductor mount which is held integral with and spaced from the lens mount by spacers and a frame, so that the focal point of each lens may coincide with the nearby end of its associated light conductor. The lenses, lens mount, conductor mount, spacers, and frame are made of materials the coefficient of expansion of which is equal to or substantially equal to each other, thereby overcoming the influence of the solar heat. Positioning means may be employed which moves the end of each light conducting member into alignment with the center of the adjacent lens, and then to the focal point of the lens and then fixes it in position. Stray beams in the apparatus may be converted into electrical energy at a suitable position or positions in the apparatus.

24 Claims, 11 Drawing Figures

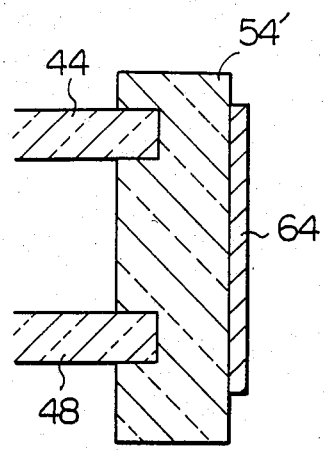
Fig. 8
Fig. 9
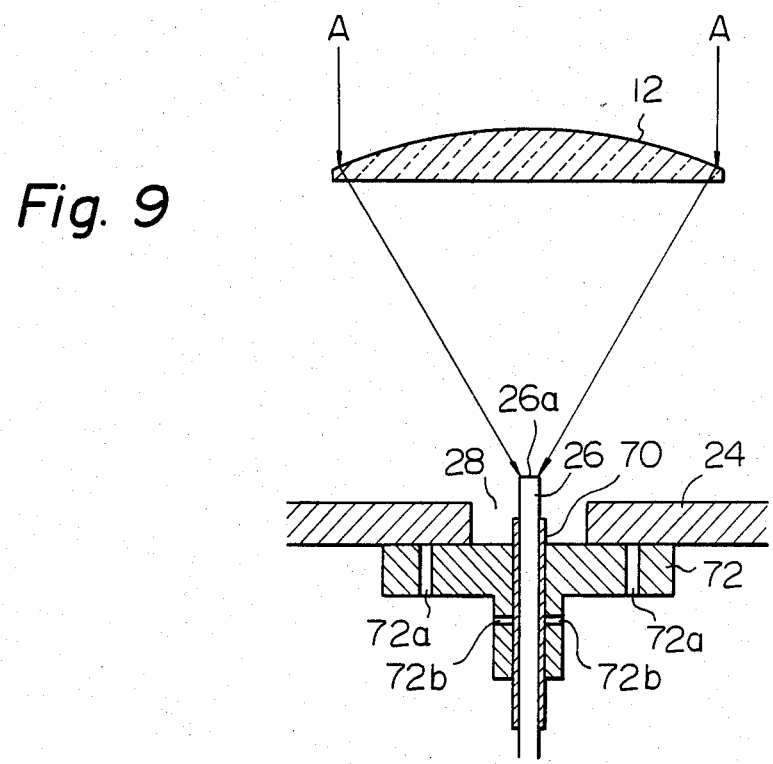

SOLAR RAY COLLECTION APPARATUS

BACKGROUND OF THE INVENTION

The present invention relates to a solar ray collection apparatus for converging solar rays or energy and routing it through a light conducting member to a desired remote station for illumination or like purpose.

A solar ray collecting and transmitting apparatus, which I have proposed, uses Fresnel lenses to converge solar rays and fiber optic cables to transmit the converged light to a remote station for illumination and other applications. Such an apparatus, winning increasing appraisal today, requires a system which is capable of provision with a relatively large capacity and production on a quantity basis in contrast to the conventional nonquantity production of small capacity apparatuses. Therefore, while the apparatus has to be of a structure which is suitable for a larger capacity and a mass-production line, merely modifying the prior art apparatus to increase its scale would not only render the structure intricate but would result in considerable time and labor necessary for focusing lenses in the course of assembly.

In detail, the prior art solar ray collector includes two or more tubular members each having a hexagonal cross-section and combined with the others to constitute a framework. Hexagonal Fresnel lenses are attached one by one to the ends of the individual tubular members. Due to such a number of Fresnel lenses, an attempt to increase the capacity of this type of apparatus would invite significant intricacy in the operation for focusing the lenses. Also, the resulting number of lens support elements would make the overall structure complicated and heavy and, thereby, the time and cost required for production would be prohibitive.

In light of the above, a large size lens may be desired for assembling a solar ray collector having a large capacity. This, however, suffers from the drawback that the lens has to be designed each time to a specific capacity of a solar ray collector at the sacrifice of the cost. It is also known that large size lenses bring about various problems when coupled with fiber optic cables.

Meanwhile, a solar ray collector is inevitably effected by the solar heat due to the construction and operation particular thereto. The solar heat tends to expand structural elements of the apparatus to different extents and, thereby, totally destruct the required optical features thereof, e.g. focal points of the lenses.

SUMMARY OF THE INVENTION

It is therefore an object of the present invention to provide a solar ray collection apparatus which is suitable for large capacity design and quantity basis production.

It is another object of the present invention to provide a solar ray collection apparatus which is producible at a low cost regardless of its capacity.

It is another object of the present invention to provide a solar ray collection apparatus which achieves a light collection efficiency incomparable to the prior art apparatus of the type described.

It is another object of the present invention to provide a solar ray collection apparatus which is furnished with an adequate countermeasure against the effects of solar heat.

it is another object of the present invention to provide a solar ray collection apparatus which is capable of accurately positioning a light conducting member relative to a lens, so that the focal point of the lens may register with a light input end of the conductor.

It is another object of the present invention to provide a generally improved solar ray collection apparatus.

A solar ray collection apparatus embodying the present invention includes a plurality of lenses and a first transparent flat support member for supporting the lenses on at least one of opposite surfaces thereof. A plurality of light conducting members equal in number to the lenses are supported by a second transparent flat support member. The second support member is integrally connected to the first support member in a predetermined spaced and parallel position. The light conducting members are carried by the second support member in such positions that one end of each of the light conducting members faces one of the lenses associated therewith and coincides with a focal point of the one lens.

The above and other objects, features and advantages of the present invention will become apparent from the following description taken with the accompanying drawings.

BRIEF DESCRIPTION OF THE DRAWINGS

FIG. 8 is a fragmentary view of a modification to the construction shown in FIG. 7;

FIG. 9 is a section of a device for positioning a light conducting member relative to a lens in accordance with the present invention;

DESCRIPTION OF THE PREFERRED EMBODIMENTS

While the solar ray collection apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
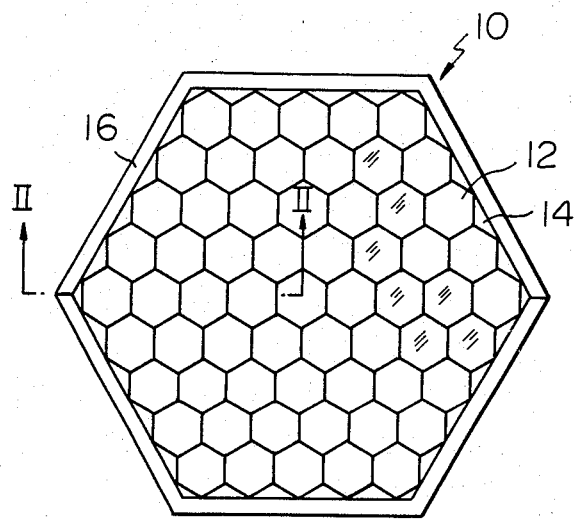
FIG. 1 is a front view of a solar ray collection apparatus embodying the present invention.

Referring to FIG. 1 of the drawings, a solar ray collection apparatus embodying the present invention is shown and generally designated by the reference numeral 10. The collector 10 comprises a mass of hexagonal lenses 12 which are rigidly mounted on a flat hexagonal lens mount 14 and arranged in contact with each other in a honeycomb structure. The lens mount 14 is made of a transparent material substantially common to the lenses 12, e.g., glass or acrylic composition, and elastically retained by a hexagonal frame 16 as will be described hereinafter.

Figure 2:
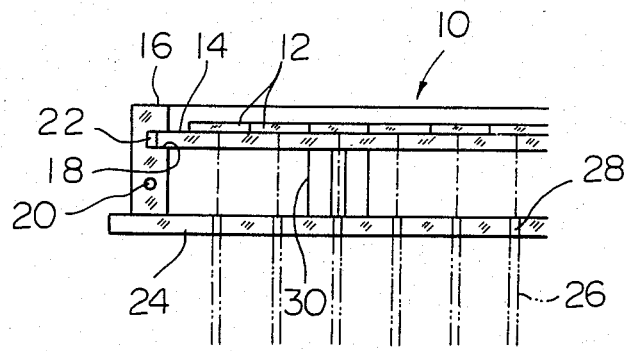
FIG. 2 is a section along line II—II of FIG. 1.
Figure 3:
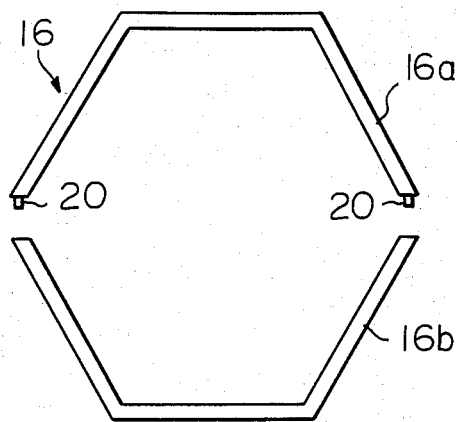
FIG. 3 is an exploded plan view of a frame included in the apparatus of FIG. 1.

Referring also to FIG. 2, the lens mount 14 carrying the lenses 12 thereon is received along peripheral edges thereof in a groove or recess 18 which is formed in the inner periphery of the frame 16. As best shown in FIG. 3, the frame 16 comprises frame halves 16a and 16b which are shaped to form a hexagon when mated together. Pins 20 are studded on opposite ends of the frame half 16a, while holes (not shown) for receiving the pins 20 are formed in both ends of the counterpart 16b. The frame halves 16a and 16b are individually recessed at their inner surfaces so that the groove 18 extends throughout the inner periphery of the hexagonal frame 16. A filler 22 made of rubber or like soft elastic material is fit in the groove 18 to yieldably back up the lens mount 14. The filler 22 will compensate for or absorb any horizontal expansion of the lens mount 14 or vibration applied thereto. The frame 16, like the lens mount 14, is preferably substantially identical in material or coefficient of expansion with the lenses 12.

As shown in FIG. 2, a second flat mount 24 is positioned below and parallel to the lens mount 14. Elongate light conducting members 26 are individually rigidly fit in aperture 28 which are formed through the conductor mount 24. The location of each light conducting member 26 is such that light incident on a lens 12 positioned just thereabove becomes focused on its top, that is, each light conducting member 26 is located at the focal point of its associated lens 12. The light conducting members 26 constitute so-called pigtails, each of which comprises a crystal rod, quartz fiber, or like single optical element and may be bundled up into a second light conducting member which, although not shown, may be a cable, fiber or tube made of quartz or plastics. With this construction, light incident on each lens 12 will be converged into the associated light conductor 26 through the lens mount 14 and then transmitted by the second conductor to a desired location.

Figure 4:
FIG. 4 is a plan view of a spacer which forms part of the construction shown in FIG. 2.

The conductor mount 24 is securely connected to the lens mount 14 through a plurality of upright spacers 30, which are mounted on the conductor mount 24 and have a common generally Y-shaped cross section (see FIG. 4). The upright spacers 30 will maintain the lens mount 14 and conductor mount 24 and, thereby, the lenses 12 and conductors 26 at a predetermined spacing from each other. The spacers 30 will also serve the function of a reference for positioning the lenses 12 on the lens mount 14 as will be described later. Again, the spacers 30 are made of a material substantially equal in coefficient of expansion to the lenses 12.

Figure 5:
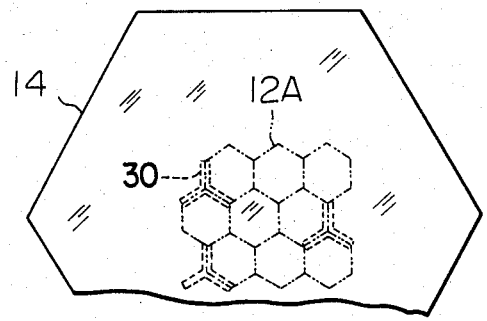
FIG. 5 is a view of the spacers and lenses shown in an exemplary position relative to each other.
Figure 6:
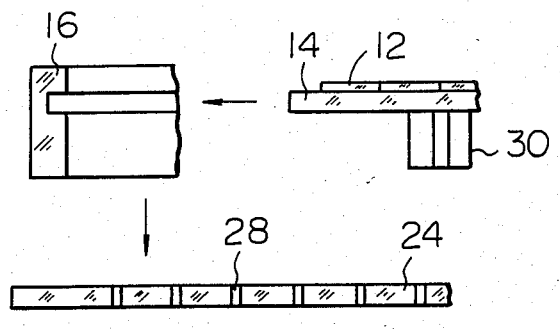
FIG. 6 is a fragmentary exploded view of the solar ray collector demonstrating a procedure for assembling it.

In assembly, the lenses 12 are first arranged in segments each consisting of several lenses as shown in FIG. 5 by way of example. The spacers 30 are adhered to selected positions on the underside of the lens mount 14. Each lens segment, 12A in FIG. 5, is positioned on the lens mount 14 as specified by the spacers 30 and then adhered to the lens mount 14. This creates an integral assembly of the lenses 12, lens mount 14 and spacers 30. Thereafter, the peripheral edges of the lens mount 14 are inserted into the groove 18 in the frame 16 and elastically retained therein by the filler 22. This is followed by placing the frame 16 on the conductor mount 24 and adhering the other (or lower ends) of the spacers 30 to the conductor mount 24. Such a procedure is illustrated in FIG. 6.

The solar ray collector 10 features various advantages as will be described. Any desired number of the collectors 10 can be assembled together to a required capacity, using the same structural elements. This, coupled with the small size of each lens 12, accomplishes economical production of such solar ray collector. The light conductors 26 can be accurately positioned relative to the lenses 12 merely by uniting the lens mount 14 and conductor mount 24 with each other via the spacers 30. The absence of any special positioning mechanism will simplify the construction and reduce the weight. Because the lenses 12, lens mount 14, frame 16, conductor mount 24 and spacers 30 are made of materials whose coefficients of expansion are substantially the same, thermal expansion of the assembly due to the solar heat will not entail distortion or deformation in any part of the assembly or affect the focal point of the lens system.

In FIG. 5, the spacers 30 may be positioned symmetrically with respect to a central one of the lenses 12. Then, deformation, if any, due to thermal expansion or the like would be substantially evenly distributed throughout the assembly thereby maintaining the lens mount 14 and conductor mount 24 and thereby the focal point of each lens and the light input end of the associated pigtail 26 under a constant relationship. This will further enhance the light collection efficiency despite any deformation.

Figure 7:
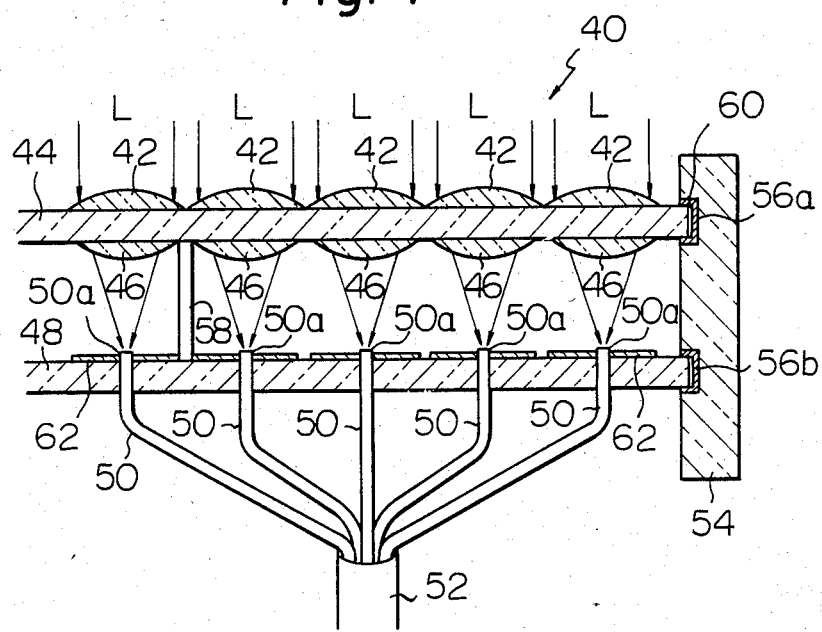
FIG. 7 is a view similar to FIG. 2 but showing another embodiment of the present invention.

Referring to FIG. 7, another embodiment of the present invention is shown. The collector 40 includes a number of first lenses 42 arranged on a transparent lens mount 44. Second lenses 46 smaller than the first 42 are carried on the underside of the lens mount 44 in one-to-one correspondence with the first lenses 42 to form lens pairs 42, 46. The optical axes of the lenses 42 and 46 in each pair are aligned with each other. Thus, each lens pair 42, 46 constitutes means for converging solar rays L incident thereon. A flat transparent conductor mount 48 carries therewith light conducting members or pigtails 50 each of which has a light input end 50a facing a lens pair 42, 46 located just thereabove and being positioned at the focal point of the lens 46. With this construction, the light L incident in each lens 42 will be converged thereby into the associated lens 46 held by lens mount 44 and, therefrom, into the end 50a of the associated pigtail 50. The reference numeral 52 shows an example of the second light conducting member discussed with reference to FIG. 2 and which may comprise a fiber optic cable or tube or an optical fiber. The light conducted by the individual conductors 50 will be collectively routed by the second light conductor 52 to a desired location.

The lens mount 44 and conductor mount 48 are integrally retained by a frame 54 at a spacing from each other which sets up the discussed optical relationship between the lenses 46 and the ends 50a of their associated pigtails 50. Elastic fillers 56a and 56b intervene between the frame 54 and the lens mount 44 and between the frame 54 and the conductor mount 48, respectively, each for the purpose described in conjunction with the filler 22 of the first embodiment.

The lenses 42 and 46, lens mount 44 and conductor mount 48 are made of materials whose coefficients of expansion are substantially the same, e.g. glass or acrylic composition.

Spacers 58 are interposed between the lens mount 44 and the conductor mount 48. The spacers 58 will not only assist the frame 54 in spacing the mounts 44 and 48 as described but promote easy integration of the mounts 44 and 48. The spacers 58 may be made of glass or acrylic composition to be moulded integrally with the others.

The lenses 46 on the underside of the lens mount 44 may comprise chromatic aberration lenses which are capable of transmitting all the wavelength components of sunlight to the pigtails 50.

In the solar ray collector 40, it will be seen that the lenses 46 paired with the lenses 42 serve to shorten the focal length of the lens system and thereby reduce the size (thickness) of the overall construction. The lenses 46 will not complicate the assembly because they need only be bonded to the lens mount 44.

The solar ray collector 40 shown in FIG. 7 further includes means for effectively converting into electrical energy the stray part of the solar rays which is not directed into the pigtails 50. For example, the light converged by the lenses 42 is partly reflected within the lens mount 44 to advance radially outwardly through the lens mount 44. This part of the light will be transformed into electrical energy by a photoelectric transducer 60 which is located at the edge of the lens mount 44 as illustrated. Meanwhile, the solar energy which fails to enter the pigtails 50 through the conductor mount 48 will be transformed into electrical energy by photoelectric transducers 62 which are carried on the top or the bottom of the conductor mount 48 around each pigtail 50.

Where use is made of an acrylic composition for the mounts 44 and 48, lenses 42 and 46 etc., there is a fear of the sunlight converged by each lens pair 42, 46 burning the conductor mount 48. To avoid this, a light intercepting plate may be placed on the top of the conductor mount 48. In this case, the transducers 62 cannot be arranged on the conductor mount 48.

Shown in FIG. 8 is a modification to the construction of FIG. 7. In this modification, the lens mount 44 and conductor mount 48 are supported by a frame 54' which is common in material to the mounts 44 and 48. A photoelectric transducer 64 is mounted on the outer periphery of the frame 54', which is thus transparent.

Referring to FIG. 9, a device for manually positioning each pigtail relative to its associated lens is illustrated. While the device shown in FIG. 9 is applicable to any one of the foregoing embodiments to replace the collective positioning procedure, the description will be made using the solar ray collector 10 of FIG. 2 for example.

In FIG. 9, a sleeve 70 is rigidly mounted on each light conducting member 26 adjacent to a light input end 26a thereof which faces the lens 12 located thereabove. A holder member 72 having a generally T-shaped cross section holds the sleeve 70 such that the focal point of the lens 12 is registered with the light input end 26a of the conductor 26. The holder 72 is formed with a plurality of holes 72a throughout the head of "T" and a plurality of holes 72b throughout the leg of "T".

To so position the light conductor 26 relative to the lens 12, the holder 72 having the sleeve 70 and conductor 26 thereinside is moved in sliding contact with the conductor mount 24, until the center of the conductor 26 becomes aligned with that of the lens 12. Under this condition, adhesive is charged into the holes 72a of the holder 72 to rigidly connect the holder 72 to the conductor mount 24. Thereafter, the sleeve 70 and thereby the conductor 26 is moved through the holder 72 along the optical axis of the lens 12. As the end 26a of the conductor 26 is brought into the focal point of the lens 12, adhesive is injected into the holes 72b to rigidly connect the sleeve 70 to the holder 72.

Where the lens 12 shown in FIG. 9 comprises a Fresnel lens, the center of the conductor 26 will be accurately registered with that of the lens 12 only if the conductor center is registered by eye with the center of the fringe pattern of the lens 12. For a more generally applicable method, use may be made of a photometer or the like and laser beams or like parallel beams, in which case the other, or light output end of the conductor 26 will be connected to the photometer while the parallel beams will be directed toward the lens 12 as indicated by arrows A. In a plane perpendicular to the optical axis of the lens 12, the holder 72 will be moves until the output of the photometer reaches the maximum. Then, in a plane parallel to the optical axis, the light conductor 26 will be moved together with the sleeve 70 to locate a position where the output of the photometer becomes the maximum.

Figure 10:
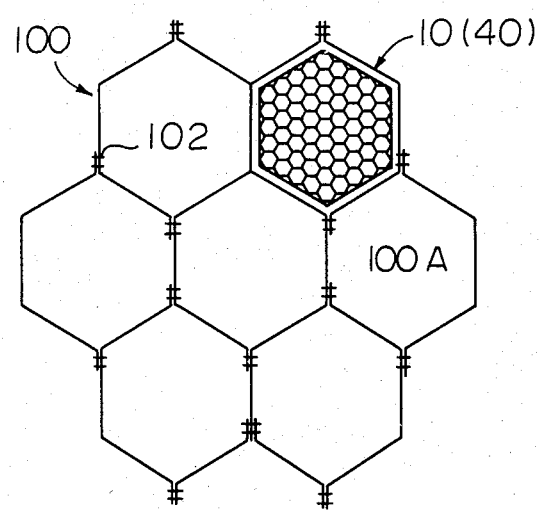
FIG. 10 is a shematic diagram representing an assembly of solar ray collectors of the present invention which may be employed for a larger collection capacity.

The solar ray collector 10 or 40 described hereinabove may be combined with any desired number of identical collectors, as illustrated in FIG. 10. A framework, generally 100, has a honeycomb structure made up of hexagonal subframes 100A. Each subframe 100A comprises a few different kinds of flat members each being formed with at least one bend and fastened to the others as by bolts 102. The collector 10 or 40 of the present invention is mounted on one end of the subframe 100A through a device not shown in the drawing. The collector assembly shown in FIG. 10 may be replaced by a larger transparent lens mount carrying a larger number of lenses than shown and described.

Figure 11:
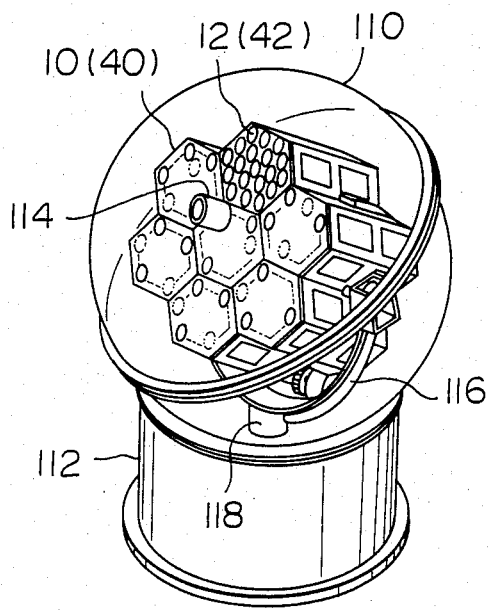
FIG. 11 is a perspective view of the assembly of FIG. 10 which is in practical operation encapsulated in a housing.

Referring to FIG. 11, the assembly of the solar ray conductor 10 or 40 in accordance with the present invention may be encapsulated in a transparent dome-shaped housing 110, which is mounted on a generally cylindrical base structure 112. The collector assembly carries therewith a sensor 114 sensitive to the sun. The collector assembly with the sensor 114 is pivotally supported by a generally C-shaped arm 116 which in turn is rigidly supported by a rotatable shaft 118. In operation, the shaft 118 and arm 116 are controlled in response to the output of the sensor 114 so that the collector assembly may constantly track the sun as long as the solar rays are available. As will be recalled, the sunlight incident on each collector 10 or 40 in the assembly in effectively converged by the lenses into the associated pigtails and routed therethrough to a desired location.

A large size apparatus for solar ray collection may be implemented by using a large size lens made of glass or acrylic composition. However, for a given light receiving area, such a lens is disproportionately large in volume and weight. In accordance with the present invention, use is made of a number of small glass or acrylic lenses each having a diameter of about 4 cm so that the weight of the lens is reduced for its light receiving area. Therefore, a large size solar ray collector is achievable which makes the whole apparatus comparatively lightweight.

Another advantage particular to the use of small lenses is that it permits the light input end of each conductor or pigtail to be reduced. For example, where the lens 12 or 42 has a diameter of 4 cm, or a focal length of about 4 cm, the diameter of a core member of each pigtail 26 or 50 needs only be about 400–800 microns, which is equal to the diameter of the resulting focal point of the lens. This allows the use of a single flexible pigtail for each lens. In contrast, where the lens has a diameter as large as 40 cm, as has been the case with the prior art apparatus, flexibility is unattainable unless numerous optical fibers of a small diameter are bundled together to form a light receiving surface; the gaps between adjacent fibers undesireably reduce the effective light receiving area. Additionally, it is quite difficult to finish the end of a fiber bundle to a precise flat surface and the light receiving efficiency heretofore attained was not more than about 30–40%. Experiments provided that the use of a single optical fiber (pigtail) for each lens in accordance with the present invention increases the light receiving efficiency to about 80%.

Furthermore, difficulty has been experienced in arranging a number of lenses neatly on a common surface without any gap. However, if such numerous lenses are arranged on the lens mount 14 or 44, what will be required is only to place the lenses on and bond them to a transparent plate finished to a flat surface (a glass or acrylic plate is easy to finish so).

In summary, it will be seen that the present invention provides a solar ray collection apparatus which is economical, easy to produce, small in size, lightweight, and excellent in light collection efficiency. Light conducting members included in the collector can be simply yet accurately positioned into registry with the focal points of their associated lenses, eliminating the need for service after the assembly.

Various modifications will become possible for those skilled in the art after receiving the teachings of the present disclosure without departing from the scope thereof. For example, while the lenses and other various components of the apparatus have been shown and described as having a hexagonal configuration, such is only for illustrative purpose and may be replaced by any other suitable shape. Still, the hexagonal lens configuration will be advantageous over the others in, for example, defining the gaps between the lenses 46 in FIG. 7 available for installing the spacers 58. If desired, a transparent material other than glass or acrylic composition may be selected for the various interconnected members of the apparatus.

What is claimed is:

1. A solar ray collection apparatus comprising:
   a plurality of lenses;
   a first transparent flat support member for supporting the lenses on a surface thereof;
   a plurality of light conducting members equal in number to the lenses; and
   a second transparent flat support member integrally connected to the first support member in a predetermined spaced parallel position, said lenses and said first and second support members having substantially the same coefficient of thermal expansion, said second support member supporting the light conducting members in such positions that one end of each of the light conducting members faces one of the lenses associated therewith and coincides with a focal point of said one lens.

2. An apparatus as claimed in claim 1, in which the lenses and the first and second support members are made of glass.

3. An apparatus as claimed in claim 1, in which the lenses and the first and second support members are made of an acrylic composition.

4. An apparatus as claimed in claim 3, further comprising a light intercepting plate which covers the surface of the second support member except for said one end of the light conducting members.

5. An apparatus as claimed in claim 1, further comprising spacer means for spacing the first and second support members from each other.

6. An apparatus as claimed in claim 5, in which the spacer means comprises a plurality of spacers each having a generally Y-shaped cross-section.

7. An apparatus as claimed in claim 1, further comprising means for converting at least a part of the solar rays which are not converged toward the light conducting members into electrical energy.

8. An apparatus as claimed in claim 7, in which the solar energy to electrical energy conversion means comprises at least one photoelectric transducer.

9. An apparatus as claimed in claim 8, in which the at least one photoelectric transducer is mounted on the outer periphery of the first support member.

10. An apparatus as claimed in claim 8, in which the at least one photoelectric transducer is mounted on the second support member circumferentially around said one end of the light conducting members.

11. An apparatus as claimed in claim 1, further comprising a plurality of second lenses mounted on the opposite surface of the first support member with their optical axes thereof aligned with the optical axes of the first lenses, said one end of the light conducting members being located at the focal point of the associated said second lenses, whereby light converged by the first lenses are further converged by the second lenses before reaching the light conducting members.

12. An apparatus as claimed in claim 1, further comprising positioning means for positioning each of the light conducting members in said position relative to one of the lenses associated therewith.

13. An apparatus as claimed in claim 12, in which the positioning means comprises a holder member for holding the light conducting member therein, said holder member being bonded to the second support member after positioning the center of the light conducting member into registry with the optical axis of the lens.

14. An apparatus as claimed in claim 13, further comprising a sleeve which is carried on the light conducting member, said sleeve being bonded to the holder member after being moved along the optical axis of the lens until said one end of the light conducting member becomes located at the focal point of the lens.

15. An apparatus as claimed in claim 1, in which the lenses are each of hexagonal shape.

16. An apparatus as claimed in claim 1, in which the first support member is of hexagonal shape.

17. A solar ray collection apparatus comprising:
   a first transparent support member having opposing flat surfaces;
   a plurality of lenses mounted on said support member on one of said flat surfaces;
   a plurality of light conducting members equal in number to the lenses;
   a second transparent flat support member supporting the light conducting members;
   structure means supporting said first and second support members in a predetermined spaced parallel position such that said second transparent flat support member supports the light conducting members in such positions that one end of each of the light conducting members faces one of the lenses associated therewith and coincides with a focal point of said one lens; and elastic means elastically retaining said first support member on said structure means, said elastic means providing for expansion of said first support member.

18. A solar ray collection apparatus comprising:
a plurality of lenses;
a first transparent flat support member for supporting the lenses on a surface thereof;
a plurality of light conducting members equal in number to the lenses;
a second transparent flat support member integrally connected to the first support member in a predetermined spaced parallel position, and
spacer means for spacing the first and second support members from each other; said lenses, said first and second support members, and said spacer means having substantially the same coefficient of thermal expansion, said second support member supporting the light conducting members in such positions that one end of each of the light conducting members faces one of the lenses associated therewith and coincides with a focal point of said one lens.

19. An apparatus as claimed in claim 18, in which the lenses, the first and second support members, and the spacer means are made of glass.

20. An apparatus as claimed in claim 18, in which the lenses, the first and second support members, and the spacer means are made of an acrylic composition.

21. A solar ray collection apparatus comprising:
a plurality of lenses;
a first transparent flat support member for supporting the lenses on a surface thereof;
a plurality of light conducting members equal in number to the lenses;
a second transparent flat support member integrally connected to the first support member in a predetermined spaced parallel position,
a frame member for uniting the first and second support members with each other, said frame member having substantially the same coefficient of thermal expansion as said support members, said second support member supporting the light conducting members in such positions that one end of each of the light conducting members faces one of the lenses associated therewith and coincides with a focal point of said one lens; and a photoelectric transducer for converting part of the solar rays nonconverged toward the light conducting members into electrical energy, the photoelectric transducer being mounted on the other periphery of the frame member.

22. A solar ray collection apparatus comprising:
a plurality of first lenses;
a first transparent flat support member for supporting the first lenses on a surface thereof;
a plurality of light conducting members equal in number to the first lenses;
a second transparent flat support member integrally connected to the first support member in a predetermined spaced parallel position, said second support member supporting the light conducting members in such positions that one end of each of the light conducting members faces one of the first lenses associated therewith and coincides with a focal point of said one lens;
a plurality of second lenses mounted on the other surface of the first support member with optical axes thereof aligned with optical axes of the first lenses, said one end of the light conducting members being located at the focal points of said second lenses, whereby light converged by the first lenses are further converged by the second lenses before reaching the light conducting members, said first and second lenses and the first and second support members having substantially the same coefficient of thermal expansion.

23. An apparatus as claimed in claim 22, in which the lenses and the support members are made of glass.

24. An apparatus as claimed in claim 22, in which the lenses and the support members are made of an acrylic composition.

* * * * *